(12) United States Patent
Thompson (10) Patent No.: US 7,168,768 B2
(45) Date of Patent: Jan. 30, 2007

(54) RUBBER COATED WHEEL

(75) Inventor: Bryan Scot Thompson, Del Mar, CA (US)

(73) Assignee: Nissan Design America, Inc., San Diego, CA (US)

( * ) Notice: Subject to any disclaimer, the term of this patent is extended or adjusted under 35 U.S.C. 154(b) by 43 days.

(21) Appl. No.: 10/738,115

(22) Filed: Dec. 18, 2003

(65) Prior Publication Data

US 2005/0134105 A1    Jun. 23, 2005

(51) Int. Cl.
*B60B 7/00* (2006.01)
(52) U.S. Cl. .......................... 301/37.101; 301/64.701; 301/37.43; 301/95.102
(58) Field of Classification Search ............ 301/37.35, 301/37.36, 37.105, 37.11, 37.12, 37.102, 301/37.101, 37.43, 5.3, 37.22, 37.23, 37.24, 301/64.701, 64.707, 95.101, 95.102; 152/379.3, 152/170, 175, 231, 47, 48, 323, 31, 277
See application file for complete search history.

(56) References Cited

U.S. PATENT DOCUMENTS

| | | | | |
|---|---|---|---|---|
| 499,859 | A | * | 6/1893 | Toomay ....................... 152/56 |
| 1,639,827 | A | * | 8/1927 | Wayne ........................... 152/6 |
| 1,968,076 | A | * | 7/1934 | Goodyear et al. ........ 301/37.23 |
| 2,209,967 | A | * | 8/1940 | Golod ........................ 301/40.3 |
| D187,263 | S | * | 2/1960 | Aske et al. ............... 301/37.22 |
| 2,937,903 | A | * | 5/1960 | Wood ....................... 301/37.23 |
| 2,964,354 | A | * | 12/1960 | Aske, Jr. et al. .......... 301/37.23 |
| 2,996,336 | A | * | 8/1961 | Wood ....................... 301/37.23 |
| 3,005,542 | A | * | 10/1961 | Harrison ...................... 206/304 |
| 3,141,794 | A | * | 7/1964 | Horner ......................... 118/505 |
| 3,597,002 | A | * | 8/1971 | Buerger .................... 301/37.23 |
| 3,726,566 | A | * | 4/1973 | Beith ........................ 301/37.11 |
| 4,146,274 | A | | 3/1979 | Lejeune |
| 4,235,271 | A | * | 11/1980 | Olsen et al. ................. 152/186 |
| 4,246,947 | A | | 1/1981 | Ewing |
| 4,416,926 | A | | 11/1983 | Maglio |

(Continued)

FOREIGN PATENT DOCUMENTS

DE            44 25 592 A1     1/1996

(Continued)

OTHER PUBLICATIONS

LEADSLED, www.work-wheels.co.jp/wheels/index/Isled/Isled_2.html, retrieved from website on Dec. 11, 2003, 2 pages.

(Continued)

*Primary Examiner*—Russell D. Stormer
(74) *Attorney, Agent, or Firm*—Foley & Lardner LLP (57) ABSTRACT

A vehicle wheel includes a central hub region and a rim coaxial with the central hub region. The rim is configured to receive a motor vehicle tire and includes an exposed annular surface visible when the tire is received on the rim. A middle region extends from the central hub region toward the rim and joins the central hub region and the rim. The wheel additionally includes a cover member configured to attach to the exposed annular surface of the rim. The cover member is configured to substantially conform to a shape of the exposed annular surface of the rim and to substantially continue a contour of the tire when the tire is received on the rim.

54 Claims, 7 Drawing Sheets

U.S. PATENT DOCUMENTS

| | | | |
|---|---|---|---|
| 4,659,148 A | | 4/1987 | Grill |
| 4,976,497 A | * | 12/1990 | Post et al. ............... 301/37.43 |
| 5,044,411 A | * | 9/1991 | Doll ........................ 152/208 |
| 5,131,727 A | * | 7/1992 | Johnson ................... 301/37.41 |
| 5,143,426 A | | 9/1992 | Todd |
| 5,236,027 A | * | 8/1993 | Lu ........................... 152/250 |
| 5,531,508 A | * | 7/1996 | Bell, III ................... 301/37.23 |
| 5,590,935 A | * | 1/1997 | McAllister ............... 301/37.11 |
| 6,116,415 A | * | 9/2000 | Rastelli ................... 206/304.1 |
| 6,691,865 B1 | * | 2/2004 | Fischer ................... 206/304.1 |
| 6,932,435 B2 | * | 8/2005 | Cutcher et al. .......... 301/37.11 |

FOREIGN PATENT DOCUMENTS

| | | |
|---|---|---|
| DE | 195 24 672 A1 | 2/1996 |
| DE | 10145085 A1 * | 6/2002 |
| EP | 0 730 985 B1 | 9/1996 |

OTHER PUBLICATIONS

Work—Ultimate Gear of Driving, Equip 02, www.work_wheels.co.jp/wheels/index/eq-02/ep-02.html, retrieved from website Dec. 11, 2003, 1 page.

* cited by examiner

RUBBER COATED WHEEL

BACKGROUND

1. Field of the Invention

The present invention relates generally to vehicle wheels and, more particularly, to a wheel that includes a cover.

2. Description of Related Art

Wheel covers are commonly used on vehicles, such as automobiles and trucks, to give the wheels a distinctive, stylized appearance. Traditionally, wheel covers include rigid, disc-shaped covers, such as hub caps and center caps, that are mounted to the wheel using conventional attachment hardware, such as nuts and bolts. When a traditional cover is installed on a wheel, the cover conceals the rim, spokes, and/or hub of the wheel and thus changes the appearance of the wheel.

One disadvantage of traditional wheel covers is that water and grime may become trapped between the wheel cover and the metal wheel, which can lead to rusting and corrosion of the wheel. Another disadvantage of traditional wheel covers is that the wheel covers may not sufficiently protect the wheel from damage. For example, small objects may enter the area between the wheel cover and the wheel and cause damage to the metal wheel, such as scratches, dents, scrapes, and/or nicks. Additionally, although traditional wheel covers may enhance the appearance of the wheel itself, they do not enhance or improve the appearance of a tire that is mounted on the wheel.

SUMMARY OF THE INVENTION

An aspect of the present invention relates to a wheel for a vehicle. The wheel includes a central hub region and a rim coaxial with the central hub region. The rim is configured to receive a motor vehicle tire and includes an exposed annular surface that is visible when the tire is received on the rim. A middle region extends from the central hub region toward the rim and joins the central hub region and the rim. The vehicle wheel additionally includes a cover member configured to attach to the exposed annular surface of the rim. The cover member is configured to substantially conform to a shape of the exposed annular surface of the rim and to substantially continue a contour of the tire when the tire is received on the rim.

Another aspect of the present invention relates to a wheel for a vehicle. The wheel has a base that includes a motor vehicle tire mounting portion, a hub portion, and a middle region. The middle region connects the tire mounting portion to the hub portion. The wheel additionally includes a cover member configured to connect to the base. The cover member is configured to substantially conform to a shape of the base and to substantially continue a contour of the tire when the tire is mounted on the tire mounting portion.

Yet another aspect of the present invention relates to a cover for a vehicle wheel. The cover includes a cover member configured to attach to an exposed annular surface of a wheel rim when a motor vehicle tire is disposed on the rim. The cover member is configured to substantially conform to a shape of the exposed annular surface of the rim and to substantially continue a contour of the tire when the tire is disposed on the rim.

BRIEF DESCRIPTION OF THE DRAWINGS

The accompanying drawings, which are incorporated in and constitute a part of this specification, illustrate embodiments of the invention and together with the description serve to explain principles of the invention.

DETAILED DESCRIPTION

Reference will now be made in detail to presently preferred embodiments of the invention, examples of which are illustrated in the accompanying drawings. An effort has been made to use the same reference numbers throughout the drawings to refer to the same or like parts.

FIGS. 1 through 7 show a wheel 10 for a motor vehicle according to an embodiment of the present invention. The wheel 10 includes a hub 20, spokes 30, a rim 40 (shown in FIG. 1), a tire 50, and a cover 60 (shown in FIG. 2).

Figure 1:
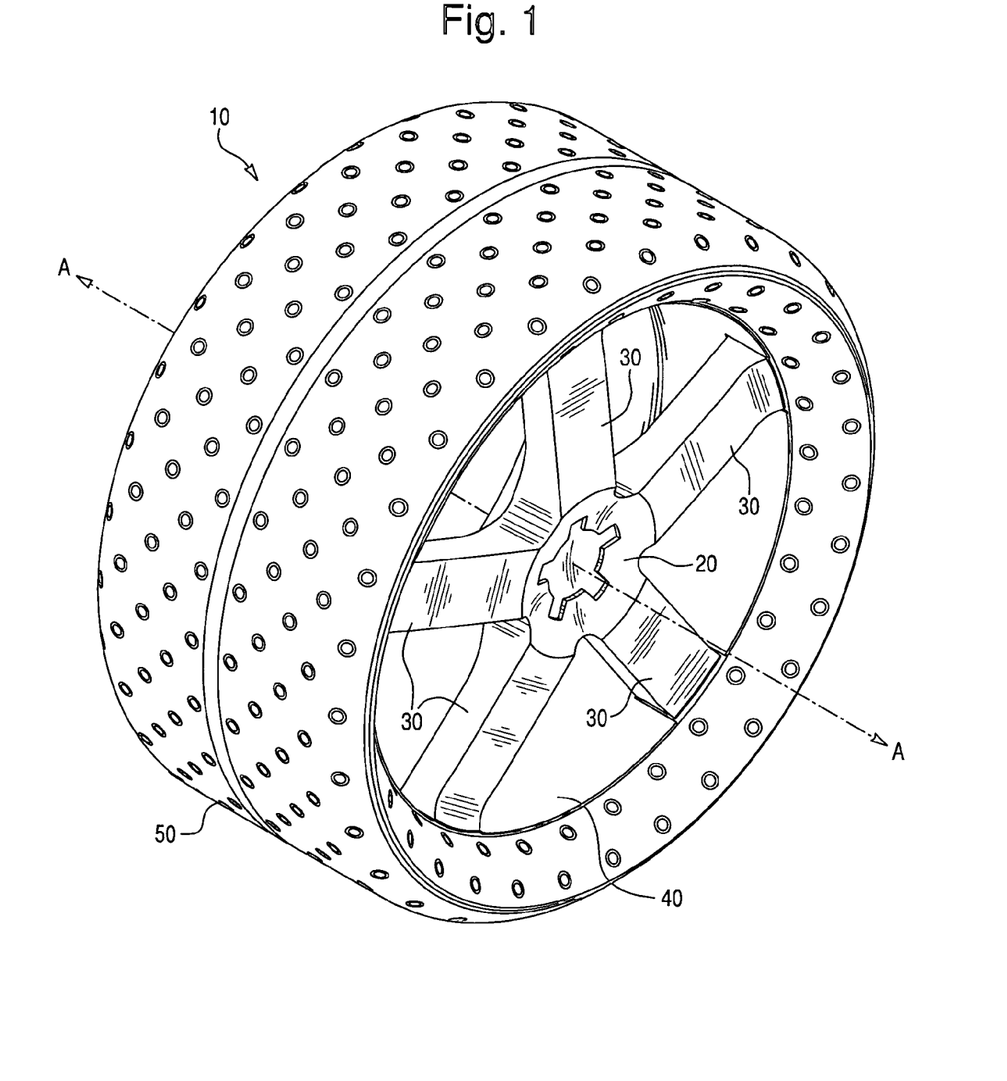
FIG. 1 is a perspective view of a wheel showing the wheel without a cover.

The hub 20 is disposed along a central axis A—A of the wheel 10, as shown in FIG. 1. The hub 20 forms part of the wheel support structure and is generally made of a metallic material, such as steel or aluminum. The hub 20 is adapted to connect to a vehicle drive axle (not shown). For example, the hub 20 may include through holes for mounting the hub 20 to an end plate of an axle using lug nuts and studs or bolts.

The spokes 30 extend radially outward from the hub 20 to the rim 40. One end of a spoke 30 is connected to the hub 20, and the opposite end of the spoke 30 is connected to the rim 40. The spokes 30 form part of the wheel support structure and are generally made of a metallic material. For example, the spokes 30 may be formed integrally with the hub 20 from stamped or pressed steel sheet. The spokes 30 can then be welded to a steel rim 40. Alternatively, the spokes 30 may be integrally formed with the hub 20 and the rim 40 from, for example, cast or machined aluminum. Alternatively, the spokes 30 may be replaced by a disc shaped member (not shown). As described above for the spokes 30, the disc shaped member extends from the hub 20 to the rim 40 and is connected to both the hub 20 and the rim 40. The disc shaped member may be continuous or may include apertures. Additionally, the disc shaped member may include contours or curves.

The rim 40 has a generally cylindrical shape and is coaxial with the hub 20, as shown in FIG. 1. As described above, the spokes 30 join the hub 20 to the rim 40. The rim 40 forms part of the wheel support structure and provides a mounting base for the tire 50. The rim 40 is generally made of a metallic material, such as steel or aluminum.

The tire 50 is a tire suitable for use on a motor vehicle. For example, the tire 50 may be an inflatable rubber tire. As shown in FIG. 1, the tire 50 is mounted on an exterior portion (not shown) of the rim 40. When the tire 50 is mounted on the rim 40, an annular interior portion or surface of the rim 40 remains exposed or visible, as shown in FIG. 1. The tire may include a tread pattern.

Figure 2:
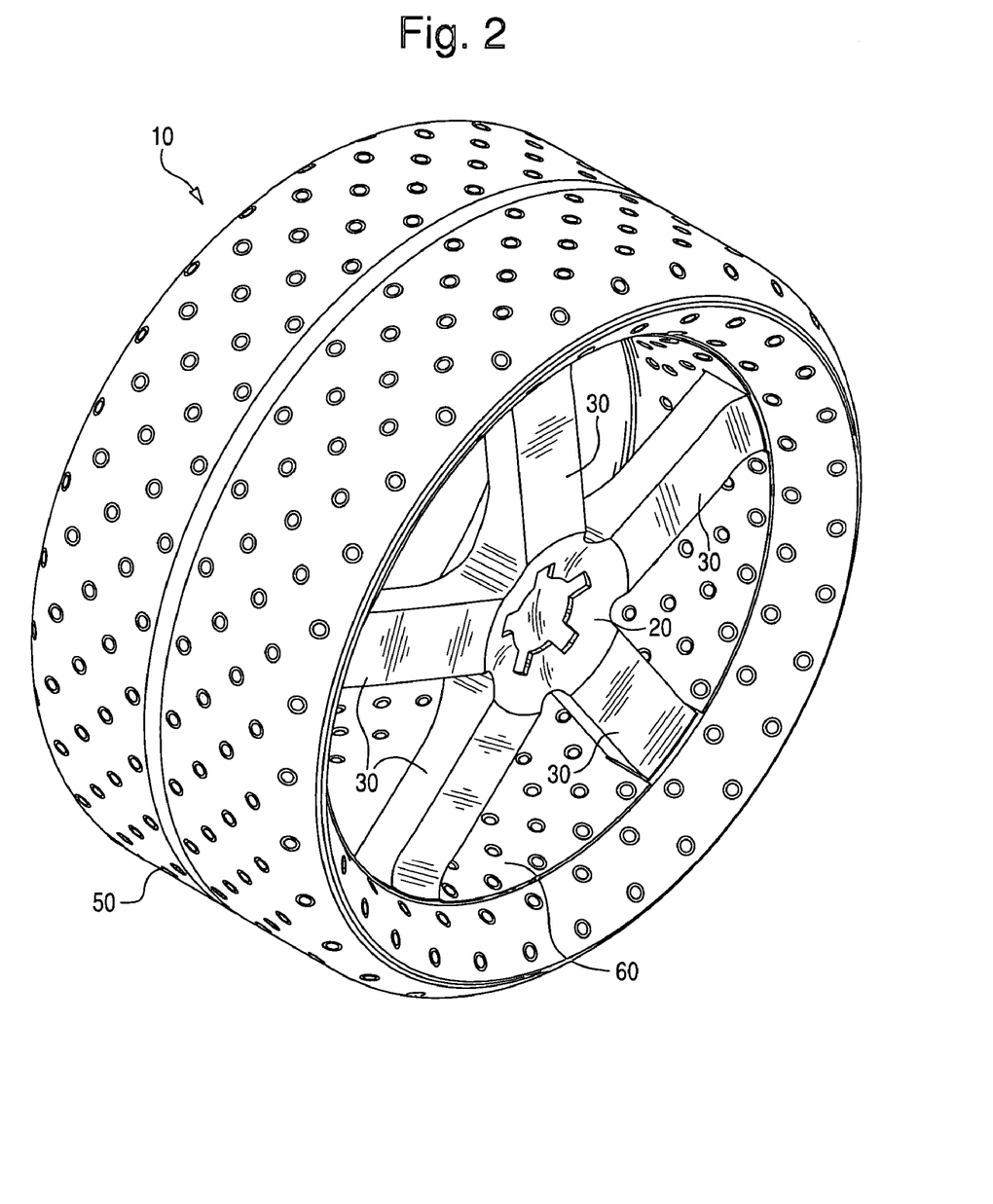
FIG. 2 is a perspective view of the wheel of FIG. 1 showing the wheel with a cover.
Figure 7:
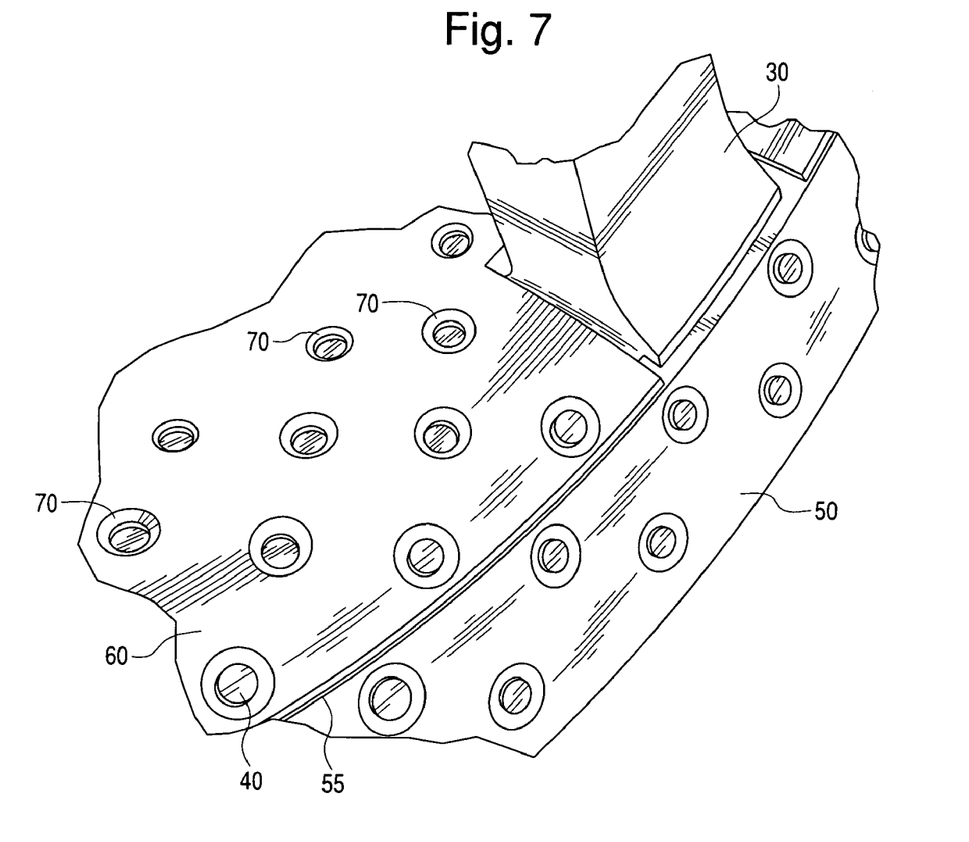
FIG. 7 is a perspective detail view of the wheel of FIG. 2.

The cover 60 is disposed on and substantially covers the exposed annular interior surface of the rim 40, as shown in FIG. 2. An edge of the cover 60 is adjacent to the tire 50 such that a parting line 55 between the cover 60 and the tire 50 is minimized in width to provide the appearance that the cover 60 and the tire 50 are a unitary structure, as shown in FIG. 7. Therefore, an upper surface of the cover 60 is preferably formed to be substantially flush with an outer surface of the tire 50. A thickness of the cover 60 is therefore dependent on an inner diameter of the rim 40 (upon which the cover 60 is disposed) and a diameter and thickness of the tire 50. As an example, the cover 60 may have a thickness of approximately ⅛ inch. In this manner, the cover 60 continues a contour of the tire 50 such that the cover 60 and the tire 50 appear to be substantially continuous.

The cover 60 is configured to conform to the shape of the rim 40. For example, the cover 60 may be made of an elastic or flexible material, such as rubber or an elastic laminate. Alternatively, the cover 60 may be made of a rigid material and preformed to match the shape of the rim 40. The cover 60 is configured to be attached or affixed to the rim 40. For example, the cover 60 may be attached to the rim 40 using an adhesive material, such as epoxy or other suitable adhesives. In this manner, the cover 60 acts as a protective layer over the exposed annular surface of the rim 40. The cover 60 can thereby protect the metal rim 40 from damage, such as scratches, dents, scrapes, and/or nicks. Additionally, when the cover 60 is formed of a corrosion resistant material, such as rubber, the cover 60 can eliminate or reduce rusting and corrosion of the metal components of the wheel 10.

Figure 3:
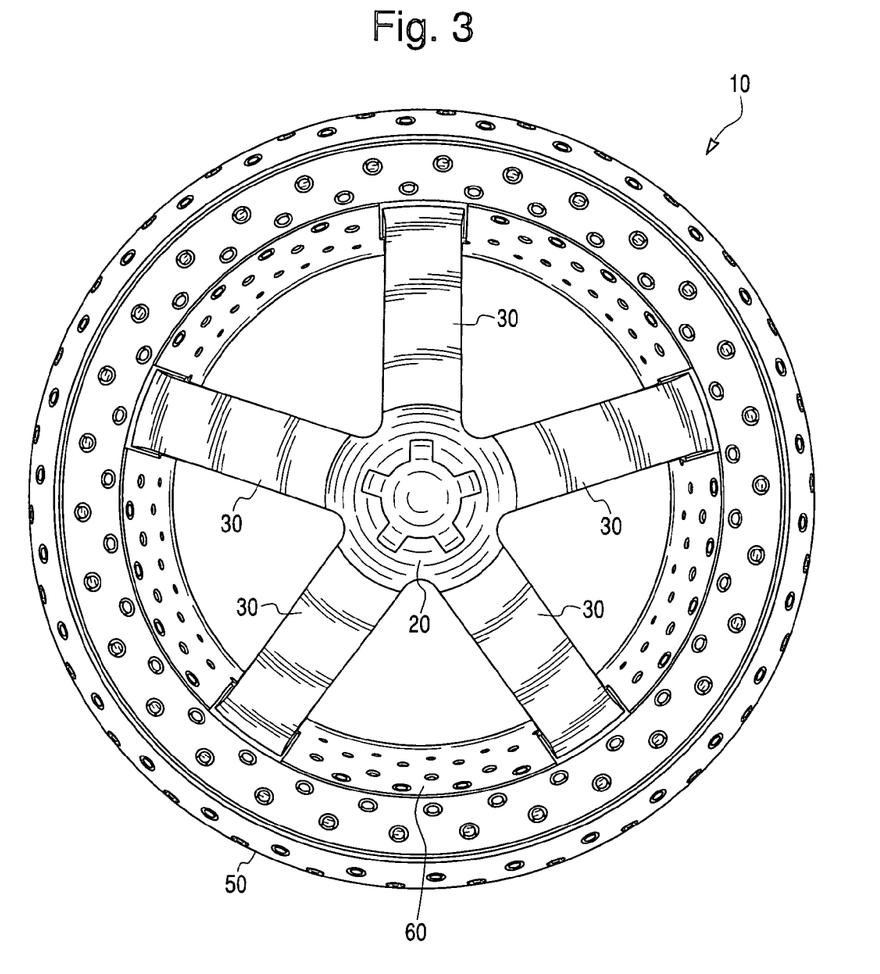
FIG. 3 is a front view of the wheel of FIG. 2.
Figure 4:
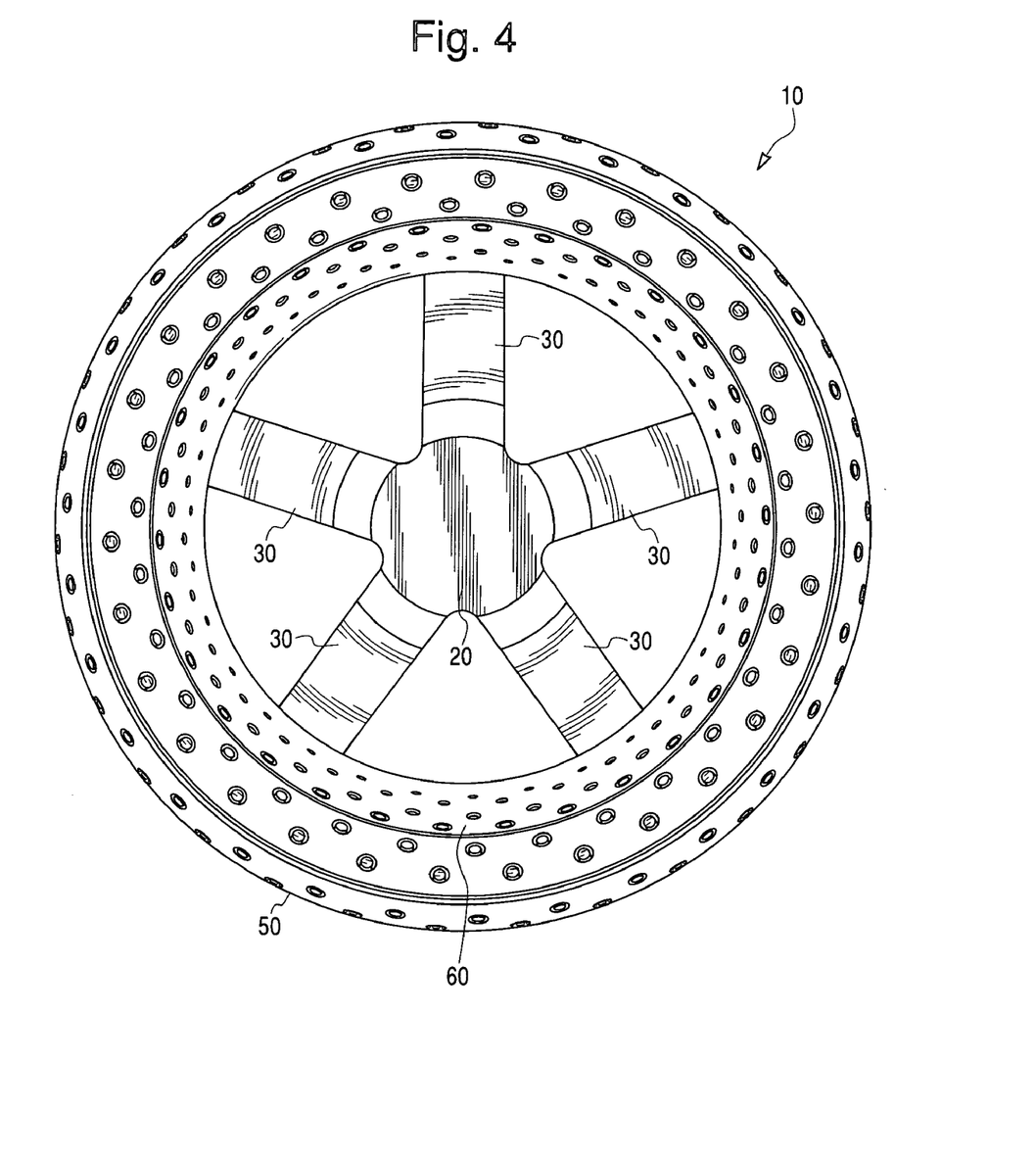
FIG. 4 is a rear view of the wheel of FIG. 2.
Figure 5:
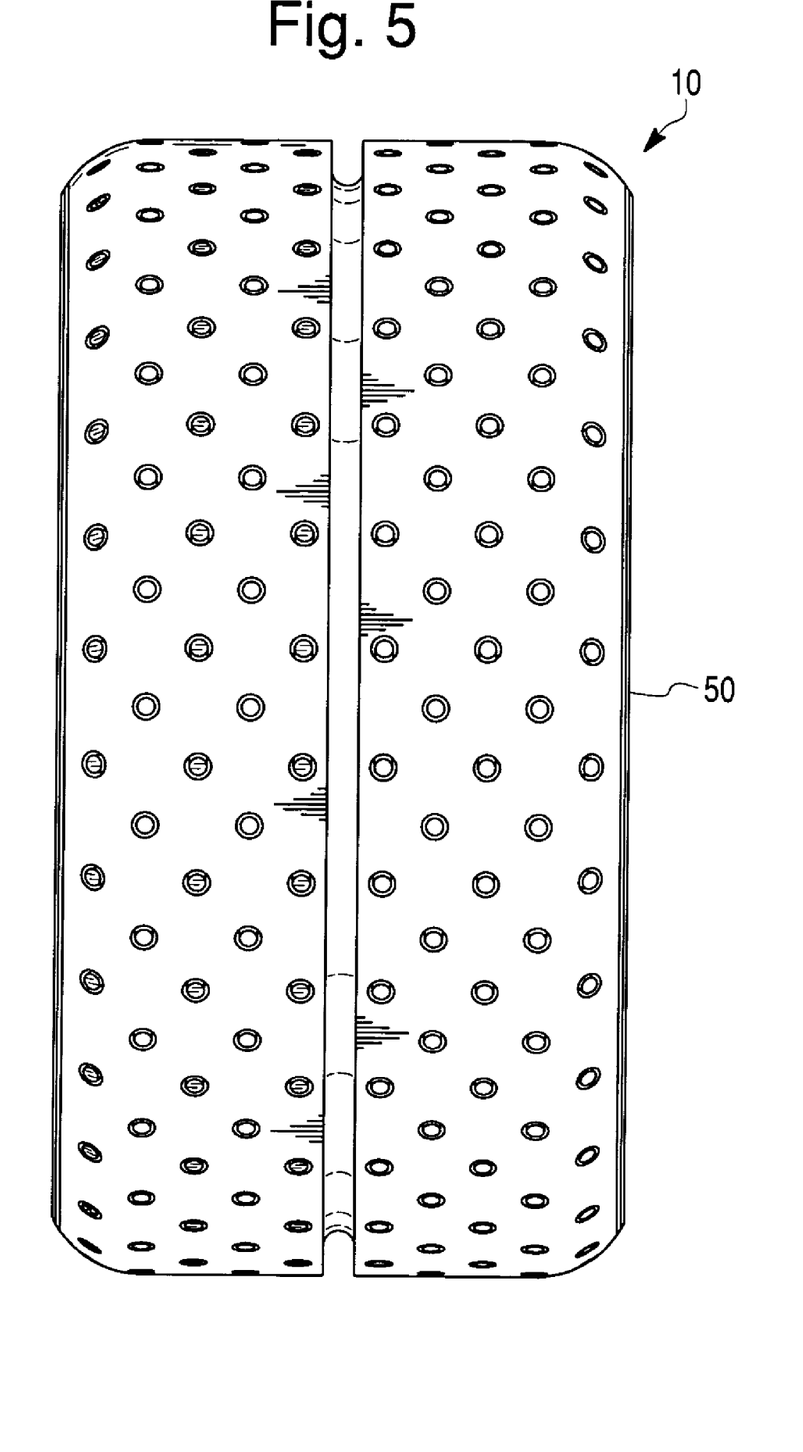
FIG. 5 is a side view of the wheel of FIG. 2.
Figure 6:
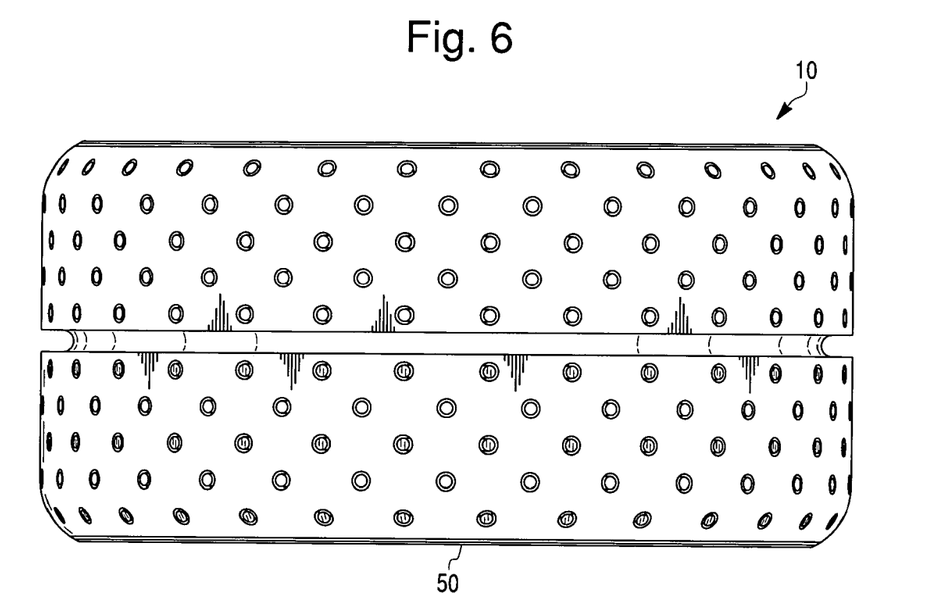
FIG. 6 is a top view of the wheel of FIG. 2.

As shown in FIG. 7, the cover 60 may optionally include a plurality of apertures 70 that extend completely through the cover 60. The apertures 70 may be, for example, circular in shape. When the cover 60 is disposed on the rim 40, the rim 40 is visible through the plurality of apertures 70, as illustrated in FIG. 7. The cover 60 may also be configured to emulate the appearance of the tire 50. For example, the cover 60 may be formed of molded rubber with a decorative pattern that matches a tread pattern on the tire 50, as shown in FIGS. 2–4. In this manner, the cover 60 appears to be an extension of the tire 50, which may be aesthetically desirable because the tire 50 appears larger than the actual tire size. Additionally, because the rim 40 is visible through the apertures 70, the cover 60 gives the appearance that the tire 50 envelops the rim 40, which may also be aesthetically desirable.

The present invention may be used on a motor vehicle, such as a car, truck, motorcycle, or the like. The present invention is also suitable for use in other wheeled vehicle applications, such as on a trailer that can be pulled by a motor vehicle.

The foregoing description has been presented for purposes of illustration and description and is not intended to be exhaustive or to limit the invention to the precise form disclosed. The embodiments above were chosen and described in order to explain the principles of the invention and its practical application and to enable one skilled in the art to utilize the invention in various embodiments and with various modifications as are suited to the particular use contemplated. Accordingly, all modifications attainable by one versed in the art from the present disclosure within the scope and spirit of the present invention are to be included as further embodiments of the present invention. The scope of the present invention is to be defined as set forth in the following claims and their equivalents.

What is claimed is:
1. A vehicle wheel, comprising:
   a central hub region;
   a rim coaxial with the central hub region, wherein the rim is configured to receive a motor vehicle tire and wherein the rim includes an exposed annular surface when the tire is received on the rim;
   a middle region extending from the central hub region toward the rim and joining the central hub region and the rim; and
   a cover member configured to attach to the exposed annular surface of the rim,
   wherein the cover member is configured to substantially conform to a shape of the exposed annular surface of the rim and to substantially continue a contour of the tire when the tire is received on the rim, and
   wherein a surface of the cover member includes a pattern, and wherein the pattern is substantially similar to a tread pattern on a surface of the tire.

2. The vehicle wheel of claim 1, wherein the cover member is attached to the exposed annular surface of the rim with an adhesive material.

3. The vehicle wheel of claim 1, wherein the cover member is configured to attach only to the exposed annular surface of the rim.

4. The vehicle wheel of claim 1, wherein at least one of the middle region and the central hub region of the wheel is free of the cover member.

5. The vehicle wheel of claim 1, wherein the cover member includes a plurality of depressions formed therein.

6. The vehicle wheel of claim 5, wherein the plurality of depressions are substantially circular in shape.

7. The vehicle wheel of claim 1, wherein the cover member is at least ⅛ inch thick.

8. The vehicle wheel of claim 1, wherein the cover member comprises an elastic material.

9. The vehicle wheel of claim 1, wherein the cover member comprises a laminate material.

10. The vehicle wheel of claim 1, wherein the cover member comprises rubber.

11. The vehicle wheel of claim 1, wherein the cover member substantially completely covers the exposed annular surface of the rim.

12. The vehicle wheel of claim 1, wherein the exposed annular surface includes an outer surface configured to face away from a vehicle body and wherein the cover member at least partially covers the outer surface.

13. The vehicle wheel of claim 1, wherein the exposed annular surface includes an inner surface configured to face a vehicle body and wherein the cover member at least partially covers the inner surface.

14. The vehicle wheel of claim 1, wherein the middle region includes a plurality of spoke members.

15. The vehicle wheel of claim 1, wherein the middle region includes a disc shaped member.

16. The vehicle wheel of claim 1, wherein a surface of the cover member is substantially flush with a surface of the tire.

17. The vehicle wheel of claim 1, wherein an edge of the cover member is disposed adjacent to an edge of the tire such that the cover member and the tire appear to be substantially continuous.

18. The vehicle wheel of claim 1, wherein the cover member attaches directly to the exposed annular surface.

19. The vehicle wheel of claim 1, wherein the cover member is not further covered.

20. A vehicle wheel, comprising:
   a central hub region;
   a rim coaxial with the central hub region, wherein the rim is configured to receive a motor vehicle tire and wherein the rim includes an exposed annular surface when the tire is received on the rim;
   a middle region extending from the central hub region toward the rim and joining the central hub region and the rim; and a cover member configured to attach to the exposed annular surface of the rim, wherein the cover member is configured to substantially conform to a shape of the exposed annular surface of the rim and to substantially continue a contour of the tire when the tire is received on the rim, wherein the cover member includes a plurality of depressions formed therein, the plurality of depressions extending completely through the cover member such that a portion of the exposed annular surface of the rim is visible through the plurality of depressions when the cover member is attached to the exposed annular surface, and wherein a surface of the cover member includes a pattern, and wherein the pattern is substantially similar to a tread pattern on a surface of the tire.

21. A vehicle wheel, comprising:

a base including a motor vehicle tire mounting portion, a hub portion, and a middle region connecting the tire mounting portion to the hub portion; and a cover member configured to connect to the base, wherein the cover member is configured to substantially conform to a shape of the base and to substantially continue a contour of a tire when the tire is mounted on the tire mounting portion, and wherein a surface of the cover member includes a pattern, and wherein the pattern is substantially similar to a tread pattern on a surface of the tire.

22. The vehicle wheel of claim 21, wherein the cover member is connected to the base with an adhesive material.

23. The vehicle wheel of claim 21, wherein the tire mounting portion is configured to include an exposed annular surface visible when a tire is disposed on the tire mounting portion.

24. The vehicle wheel of claim 23, wherein the cover member is configured to connect only to the exposed annular surface of the tire mounting portion.

25. The vehicle wheel of claim 23, wherein the cover member substantially completely covers the exposed annular surface of the tire mounting portion.

26. The vehicle wheel of claim 21, wherein an outer surface of at least one of the hub portion and the middle region is free of the cover member.

27. The vehicle wheel of claim 21, wherein the cover member is at least ⅛ inch thick.

28. The vehicle wheel of claim 21, wherein the cover member comprises an elastic material.

29. The vehicle wheel of claim 21, wherein the cover member comprises a laminate material.

30. The vehicle wheel of claim 21, wherein the cover member comprises rubber.

31. The vehicle wheel of claim 21, further comprising a plurality of depressions formed in the cover member.

32. The vehicle wheel of claim 21, wherein the cover member substantially completely covers an outer surface of at least one of the tire mounting portion, the hub portion, and the middle region.

33. The vehicle wheel of claim 21, wherein the middle region is free of the cover member, and wherein the cover member substantially completely covers an outer surface of the tire mounting portion.

34. The vehicle wheel of claim 21, wherein a surface of the cover member is configured to be substantially flush with a surface of the tire when the tire is mounted on the tire mounting portion.

35. The vehicle wheel of claim 21, wherein an edge of the cover member is configured to be disposed adjacent to an edge of the tire when the tire is mounted on the tire mounting portion such that the cover member and the tire appear to be substantially continuous.

36. The vehicle wheel of claim 21, wherein the cover member is not further covered.

37. A cover for a vehicle wheel, comprising:

a cover member configured to attach to an exposed annular surface of a wheel rim when a motor vehicle tire is disposed on the rim, wherein the cover member is configured to substantially conform to a shape of the exposed annular surface of the rim and to substantially continue a contour of the tire when the tire is disposed on the rim, wherein the cover member includes a plurality of depressions formed therein, the plurality of depressions extending completely through the cover member such that a portion of the exposed annular surface of the rim is visible through the plurality of depressions when the cover member is connected to the rim, and wherein a surface of the cover member includes a pattern, and wherein the pattern is substantially similar to a tread pattern on a surface of the tire.

38. The cover of claim 37, wherein the wheel rim is connected to a central hub region by a middle region, and wherein the cover member is configured so that at least one of the middle region and the central hub region of the wheel is free of the cover member when the cover member is attached to the exposed annular surface of the rim.

39. The cover of claim 38, wherein the middle region includes a plurality of spoke members.

40. The cover of claim 38, wherein the middle region includes a disc shaped member.

41. The cover of claim 37, wherein the cover member is configured to attach to the exposed annular surface of the rim with an adhesive material.

42. The cover of claim 37, wherein the cover member is configured to attach only to the exposed annular surface of the rim.

43. The cover of claim 37, wherein the plurality of depressions are substantially circular in shape.

44. The cover of claim 37, wherein the cover member is at least ⅛ inch thick.

45. The cover of claim 37, wherein the cover member comprises an elastic material.

46. The cover of claim 37, wherein the cover member comprises a laminate material.

47. The cover of claim 37, wherein the cover member comprises rubber.

48. The cover of claim 37, wherein the cover member is configured to substantially cover the exposed annular surface of the rim.

49. The cover of claim 37, wherein a surface of the cover member is configured to be substantially flush with a surface of the tire when the tire is disposed on the rim.

50. The cover of claim 37, wherein an edge of the cover member is configured to be disposed adjacent to an edge of the tire when the tire is disposed on the rim such that the cover member and the tire appear to be substantially continuous.

51. A vehicle wheel, comprising:

a central hub region;

a rim coaxial with the central hub region, wherein the rim is configured to receive a motor vehicle tire and wherein the rim includes an exposed annular surface when the tire is received on the rim;

a middle region extending from the central hub region toward the rim and joining the central hub region and the rim; and a cover member configured to attach to the exposed annular surface of the rim, wherein the cover member is configured to substantially conform to a shape of the exposed annular surface of the rim, and a portion of the cover member is positioned adjacent to a flange of the rim to provide the appearance that the cover member and tire are a unitary structure when the tire is received on the rim and wherein a surface of the cover member includes a pattern, and wherein the pattern is substantially similar to a tread pattern on a surface of the tire.

52. The vehicle wheel of claim 51, wherein a portion of the cover member extends along an outboard portion of the rim.

53. The vehicle wheel of claim 51, wherein a portion of the cover member extends from an inboard flange of the rim to an outboard flange of the rim.

54. A vehicle wheel, comprising:

a central hub region;

a rim coaxial with the central hub region, wherein the rim is configured to receive a motor vehicle tire and wherein the rim includes an exposed annular surface when the tire is received on the rim;

a middle region extending from the central hub region toward the rim and joining the central hub region and the rim; and a cover member configured to attach to the exposed annular surface of the rim, wherein the cover member is configured to substantially conform to a shape of the exposed annular surface of the rim and to substantially continue a contour of the tire when the tire is received on the rim, and wherein a surface of the cover member includes a pattern, and wherein the pattern is substantially similar to a pattern on a surface of the tire.

* * * * *